Figure 1:
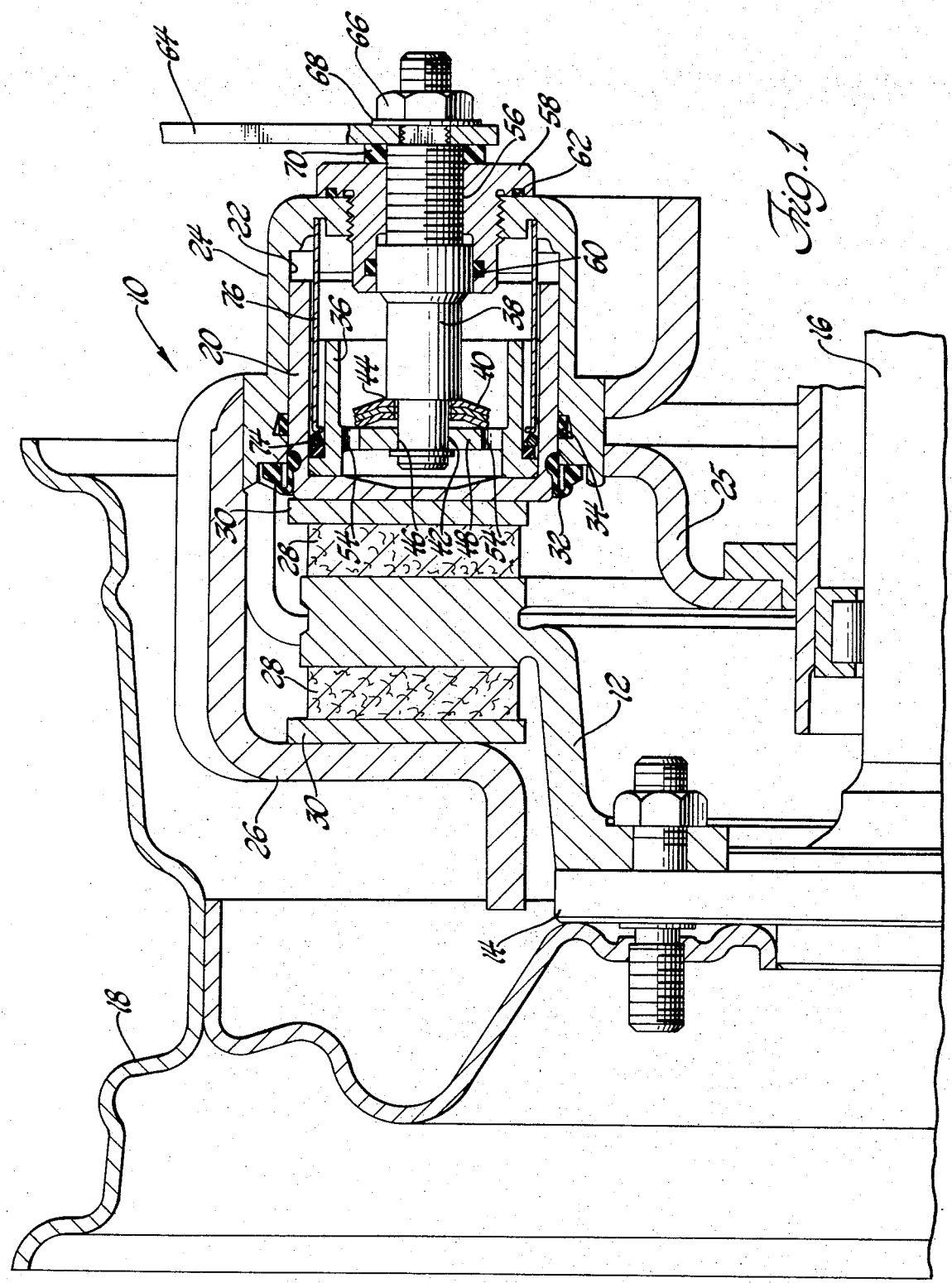

United States Patent [19]
Pringle

[11] 3,866,721
[45] Feb. 18, 1975

[54] DISC BRAKE PARKING FEATURE

[75] Inventor: William L. Pringle, Gross Pointe Shores, Mich.

[73] Assignee: William L. Pringle & Associated, Inc., Detroit, Mich.

[22] Filed: Jan. 15, 1973

[21] Appl. No.: 323,481

[52] U.S. Cl. ............ 188/72.6, 188/106 F, 188/217
[51] Int. Cl. ............................................. F16d 55/26
[58] Field of Search ............ 188/106 F, 72.6, 72.8, 188/72.9, 217, 72.1, 72.4

[56] References Cited
UNITED STATES PATENTS

| | | | |
|---|---|---|---|
| 3,035,666 | 5/1962 | Beeskow | 188/217 |
| 3,378,109 | 4/1968 | Bauman | 188/72.8 X |
| 3,432,009 | 3/1969 | Bricker | 188/106 F |
| 3,587,788 | 6/1971 | Beach et al. | 188/106 F X |
| 3,651,896 | 3/1972 | Fannin | 188/72.6 X |
| 3,653,472 | 4/1972 | Dowell | 188/217 |

*Primary Examiner*—Lloyd L. King
*Assistant Examiner*—Randolph A. Reese
*Attorney, Agent, or Firm*—McGlynn and Milton

[57] ABSTRACT

A disc brake assembly comprising: friction members for frictionally engaging a rotor, and an actuator member for moving the friction member into frictional engagement with the rotor; the actuator member including a mechanical energy storage member for maintaining the friction members in frictional engagement with the rotor regardless of the thermal contraction of the various friction elements upon cooling. The mechanical energy storage member comprises a plurality of belleville-type spring members mounted on a threadedly movable shaft which engage the actuator member for maintaining the friction members in frictional, braking engagement with the rotor.

14 Claims, 2 Drawing Figures

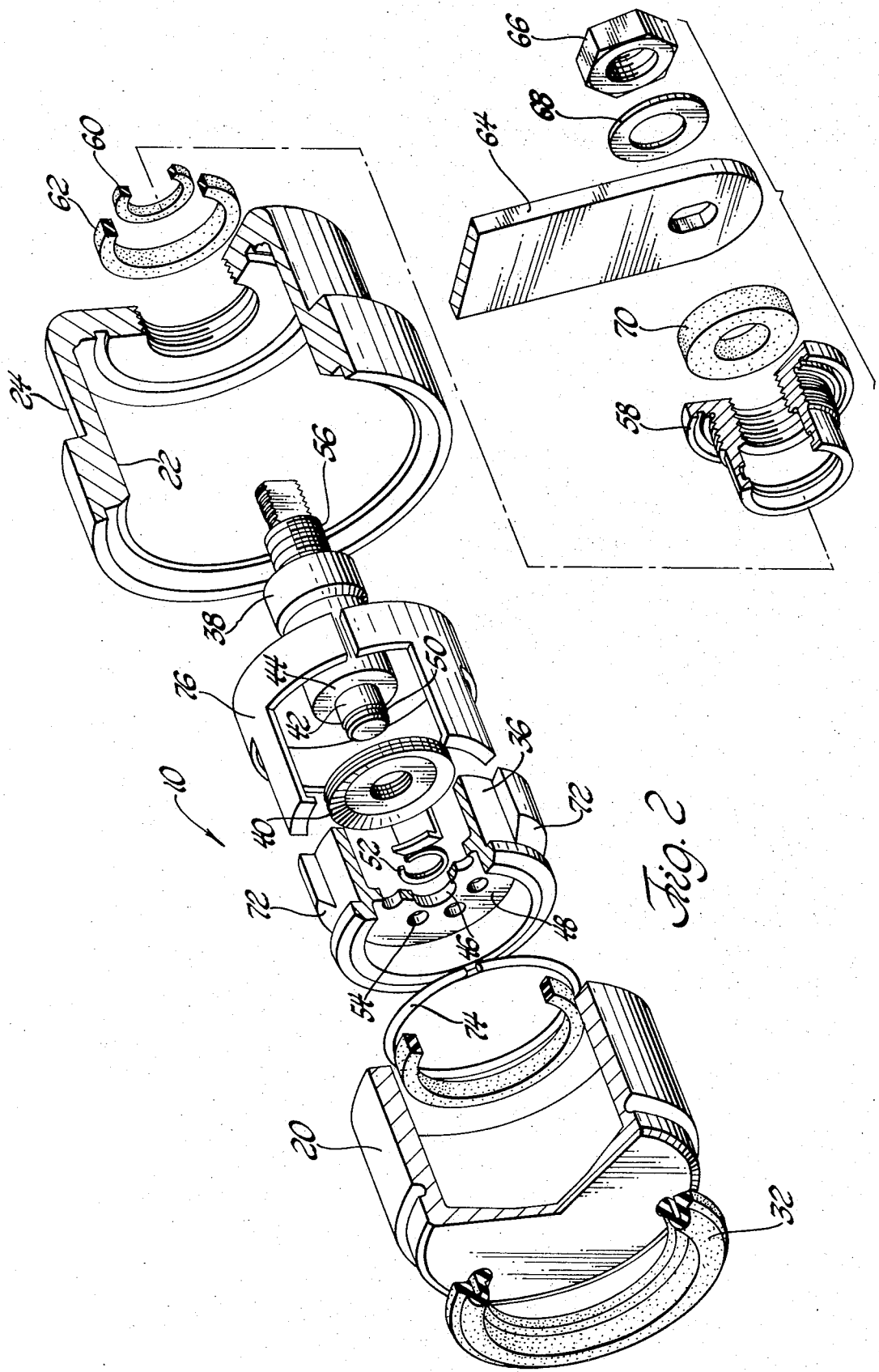

3,866,721

DISC BRAKE PARKING FEATURE

This patent generally relates to disc brake systems for automobiles and the like. A common form of a disc brake system is the floating caliper disc brake which is hydraulically actuated to clamp down upon and frictionally engage an annular friction disc which is integrally connected to the rotating hub portion of an automobile wheel.

One problem which arises with the use of disc brake systems is the difficulty of providing a dependable parking brake. Generally speaking, a parking brake may be provided by including a manually actuated mechanical device which keeps the brake members "clamped down" on the annular friction disc to prevent the wheel from turning. The problem arises because, after repeated applications of the brake system while the car is in use, the friction disc and other brake elements become very hot and undergo thermal expansion. When the automobile is stopped, and the parking brake is applied, the brake will hold quite well until the friction disc and other elements begin to cool and shrink. When shrinkage occurs, the clamping force of the brake members on the friction disc is reduced, thus reducing the amount of braking force. If the automobile is parked on an incline, the parking brake can be sufficiently disabled so that the automobile will roll or move.

Due to the above problem, domestic cars are normally only equipped with front wheel disc brakes, their rear wheels being provided with the more conventional drum and shoe type brake, which is easily adapted to include a dependable parking brake feature. Furthermore, foreign cars which are equipped exclusively with disc brakes cannot be imported into this country because these automobiles are not capable of passing the rigid tests which determine the effectiveness of a parking brake. Since disc brakes have proven to be more desirable than the older, conventional brakes, many attempts have been made in recent years to develop a reliable parking brake for use with disc brake systems, as shown in U.S. Pat. Nos. 3,647,031; 3,612,225; and 3,432,009.

It is therefore an object and feature of the instant invention to provide a disc brake assembly including a rotor, friction means for frictionally engaging the rotor, and actuator means for moving the friction means into frictional engagement with the rotor; the actuator means including mechanical energy storage means for maintaining the friction means in frictional engagement with the rotor.

It is another object and feature of the instant invention to include energy storage means comprising resiliently deformable means, such as a spring member, for storing mechanical energy whereby the braking force on the rotor is maintained notwithstanding the shrinkage of the brake elements upon cooling.

Other objects and features of the instant invention will be readily appreciated as the same becomes better understood by reference to the following detailed description when considered in connection with the accompanying drawings wherein:

FIG. 1 is a cross-sectional elevational view of a preferred embodiment constructed in accordance with the instant invention; and FIG. 2 is an exploded view, partially cutaway, of the instant invention shown in FIG. 1.

Referring to the drawings, a disc brake assembly is generally shown at 10. The disc brake assembly 10 includes a brake disc or rotor 12, which is attached for rotation with the wheel hub 14 on the axle 16 of an automobile. A conventional wheel 18 is shown mounted on the wheel hub 14 in the normal fashion.

The disc brake assembly 10 includes friction means for frictionally engaging the rotor 12. The friction means includes a brake piston 20, which is disposed for sliding movement within the bore 22 of a housing 24, and a floating caliper member 26 which is secured to the housing 24. The housing 24 is slidably mounted on a mount 25 which is secured to the axle 16 of the automobile. The friction means further includes friction pads 28 and backing plates 30 for facilitating frictional engagement with the rotor 12.

A boot seal 32 is disposed between the brake piston 20 and the housing 24 to provide a pressurized fluid seal therebetween and to facilitate movement of the piston 20 with respect to the housing 24. A ring seal 34 is also included which provides a fluid seal between the brake piston member 20 and the housing 24. A brake line (not shown) is attached to the rear of the housing 24 in communication with the bore 22. The bore 22 of the housing 24 is entirely sealed, such that when fluid pressure is introduced into the bore 22 through the brake line, the brake piston 20 moves to the left, as shown in FIG. 1, until it engages the rotor 12. Engagement of the brake piston 20 with the rotor 12 causes a reaction force which moves the housing 24 and thus the caliper member 26 to the right, thereby causing both sides of the rotor 12 to be frictionally engaged. The frictional engagement produced by the clamping force on the rotor 12 causes the rotational speed of the wheel hub 14 and the wheel 18 to be reduced.

The description heretofore, sets forth a more or less common disc brake system of the floating caliper type which is hydraulically actuated during normal driving to apply a braking force to a rotational disc or rotor. The parking brake feature which is the subject matter of the instant invention generally includes means for mechanically (as distinguished from hydraulically) moving the friction means into frictional engagement with the rotor 12.

The parking brake feature, therefore, includes actuator means for mechanically moving the brake piston member 20 and thus the caliper member 26 into frictional engagement with the rotor 12. The actuator means includes a generally cylindrical actuator member 36 which is mounted on a movable shaft 38. The actuator member includes mechanical energy storage means which is comprised of resiliently deformable members in the form of a plurality of belleville-type springs 40 for storing mechanical energy.

The shaft 38 includes a reduced portion 42 on its inner end which defines a shoulder 44. The reduced portion 42 extends through an opening 46 in a transverse internal wall 48 in the actuator 36. A plurality of belleville-type springs 40 are disposed between the actuator 36 and a shoulder 44 adjacent the reduced portion 42. Lock means comprising the annular groove 50 and lock ring 52 are disposed on the shaft 38 to hold the actuator 36 thereon. The actuator 36 is, therefore, adapted for limited movement between a first position defined by the lock ring 52 and a second position defined by the shoulder 44 along the reduced portion 42 of the shaft 38, which movement is restricted by the belleville-type springs 40. Additionally, the internal wall 48 of the actuator 36 is provided with a plurality of holes 54 to permit unrestricted fluid communication between the bore 22 and the brake piston member 20.

The shaft 38 includes threads 56 at its outer end which enables it to be threadedly mounted in a bushing 58 disposed in the rear wall of the housing 24. The bushing 58 includes a first ring seal 60 for sealing engagement with the shaft 38 and a second ring seal 62 for sealing engagement with the housing 24. The shaft 38 is adapted for threaded longitudinal movement through the bore 22 in the housing 24. A lever 64 is secured to the end of the shaft 38 by a nut 66, washer 68, and ring 70 to facilitate rotation of the shaft 38. The lever 64 is connected to a remote control assembly (not shown) of any well-known design which is operated by a parking brake pedal or the like.

For mechanical actuation of the friction means to apply a parking brake force, the lever 64 is rotated in one direction, causing the shaft 38 to threadedly move to the left as viewed in FIG. 1. The stiff resilience of the belleville-type springs 40 causes the actuator 36 to move against the brake piston member 20, thereby moving it to the left. The reaction force produced by the engagement of the brake piston member 20 with the rotor 12 causes the caliper member 26 to also engage the rotor 12, similar to the reaction caused by hydraulic pressure. As the clamping force on the rotor 12 is increased, the belleville-type springs 40 begin to collapse, and the reduced portion 42 of the shaft 38 moves through the opening 46 in the wall 48 of the actuator 36. In the collapsed position, the belleville-type springs 40 store potential mechanical energy. In the event that the brake elements, such as the rotor 12, friction pads 28, or backing plate 30 are hot and thereby subject to thermal expansion, subsequent shrinkage due to cooling will not substantially affect the braking force or clamping force on the rotor 12 because the belleville-type springs will continue to urge the actuator 36 to the left and, therefore, toward the first position. In other words, any sloppiness caused by shrinkage will be compensated for by the belleville-type springs 40. Rotation of the lever 64 in the opposite direction releases the braking force by moving the actuator 36 out of engagement with the brake system 20 and the rotor 12 and thereby the wheel 18 is free to rotate.

The disc brake assembly is also provided with a wear takeup device which comprises the subject matter of a co-pending patent application Ser. No. 323,569, now U.S. Pat. No. 3,812,935, of the inventor of the instant invention.

Generally, the wear takeup device includes a plurality of ramp members 72 disposed on the actuator member 36 which coact with an expandable ring member 74. When the actuator member 36 moves to the left as shown in FIG. 1 the ring member 74 moves up the ramp members 72 and wedges against the interior of the brake piston 20 causing it to move with the actuator member. A disabler member 76 is also provided which disengages the ring member 74 from the brake piston 20 when the actuator member 36 is moved to the right. The wear takeup mechanism is provided to insure positive interaction between the actuator member 36 and the brake piston 20 regardless of any wear experienced by any of the friction members. In other words, the brake piston 20 can move to the left as wear occurs without rendering the actuator member 36 inoperative.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privelege is claimed are defined as follows:

1. A disc brake assembly comprising: friction means for frictionally engaging a rotor, and actuator means for moving said friction means into frictional engagement with the rotor in response to the application of a braking force; said actuator means including a mechanically movable shaft member, an actuator member engageable with said friction means mounted on said movable shaft member and movable relative to said movable shaft member between first and second positions, said first position being toward frictional engagement, and mechanical energy storage means operatively connected between said movable shaft member and said actuator member to continuously urge said actuator member toward said first position for maintaining said friction means in frictional engagement with the rotor wherein said mechanical energy storage means acquires mechanical energy during the application of a braking force which causes movement of said actuator member from said first position to said second position.

2. An assembly as set forth in claim 1 wherein said storage means includes resiliently deformable means for storing mechanical energy.

3. An assembly as set forth in claim 1 wherein said resiliently deformable means is disposed on said shaft adjacent said actuator.

4. An assembly as set forth in claim 3 wherein said friction means includes a piston member and a caliper member.

5. An assembly as set forth in claim 4 including a housing having a bore therethrough, said piston member being slidably disposed within said bore and said caliper member being slidably disposed on said housing.

6. An assembly as set forth in claim 5 wherein said shaft is mounted for longitudinal movement in said bore.

7. An assembly as set forth in claim 6 wherein said shaft includes threads for longitudinal threaded movement within said bore.

8. An assembly as set forth in claim 7 wherein said housing includes a bushing having a threaded bore for mounting said shaft in said housing for threaded movement therein.

9. An assembly as set forth in claim 8 wherein said resiliently deformable means includes spring members.

10. An assembly as set forth in claim 9 wherein said spring members comprise belleville-type springs.

11. An assembly as set forth in claim 9 wherein said shaft includes a reduced portion defining a shoulder, said actuator being mounted for limited movement on said reduced portion and said spring members being disposed between said shoulder and said actuator.

12. An assembly as set forth in claim 11 wherein said shaft includes lock means for holding said actuator on said shaft.

13. An assembly as set forth in claim 12 wherein said lock means includes an annular groove disposed on said reduced portion of said shaft and a lock ring for mating with said annular groove.

14. An assembly as set forth in claim 13 including lever means for rotating such shaft to threadedly move said shaft in said bore.

* * * * *